(No Model.)
E. P. USHER.
STORAGE BATTERY.
No. 509,272. Patented Nov. 21, 1893.
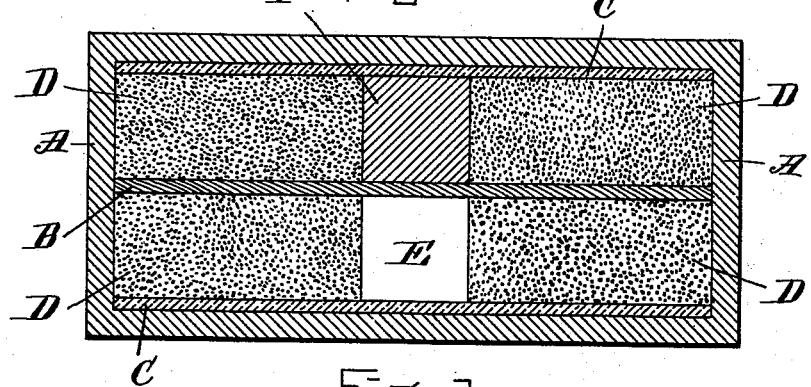
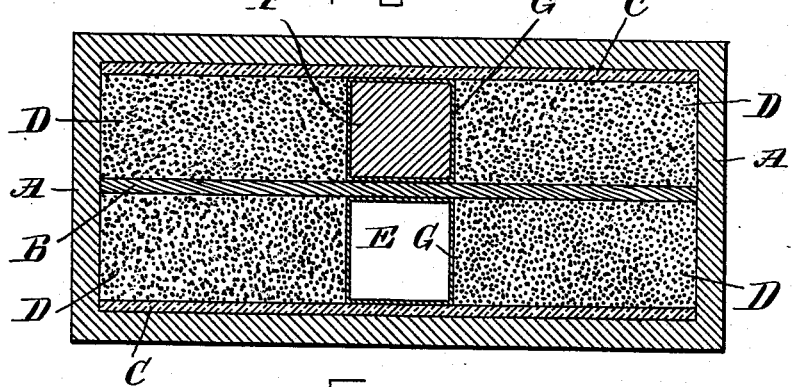
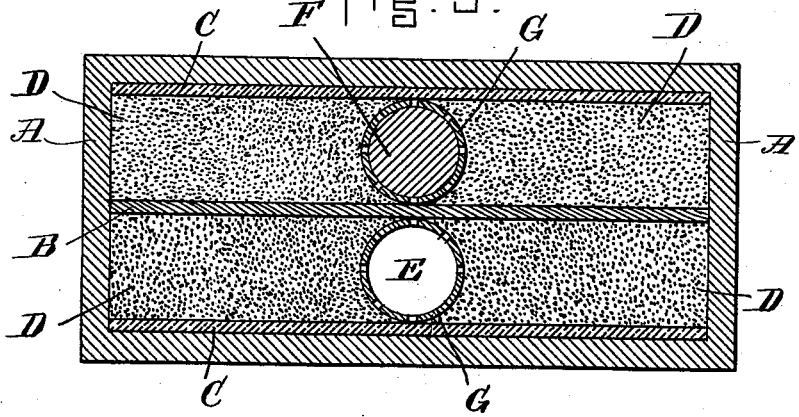
WITNESSES.
R. Henry Marsh.
L. F. Bridge.
INVENTOR.
Edward P. Usher
by his attorney

UNITED STATES PATENT OFFICE.

EDWARD P. USHER, OF GRAFTON, MASSACHUSETTS, ASSIGNOR TO THE HOPEDALE ELECTRIC COMPANY OF WEST VIRGINIA, OF WEST VIRGINIA.

STORAGE-BATTERY.

SPECIFICATION forming part of Letters Patent No. 509,272, dated November 21, 1893.

Application filed January 23, 1893. Serial No. 459,479. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

My invention relates to storage batteries, my object being to simplify and cheapen their construction to the utmost, and to obviate many of the difficulties hitherto experienced. In the simple form of a single pair I employ metallic conducting sheets or strips and midway between them a wooden or like porous separating wall, and I pack into the intervening spaces dry powdered lead oxide or equivalent material to become active, taking care to preserve or form vertical openings or wells through such packed substance, in order that the acid employed may have access to every part thereof and that the gases may escape freely. I prefer to preserve these openings when packing the spaces by inserting in each, one or more vertical rods, around which the material is firmly compressed, so that when the rods are removed, upwardly, suitable openings will remain, the firmness of the packing causing the powder to retain its place and not close the wells. I find it advantageous, however, to wrap a piece of thin paper or perforated lead foil around the rod, such thin wrapper remaining in place when the rod is removed and forming a temporary lining, but becoming speedily disintegrated when the acid enters. A perforated rubber or other tube may be used as a permanent lining. These wells or openings may however be formed in the packed material by forcing downwardly therein a pointed rod which will laterally displace the powder and compact it sufficiently. If the rod is somewhat tapering it can be more readily removed. The wall which separates the plates is preferably a thin sheet of kiln dried wood. A series of these simple pairs, separately in closed, may be connected together electrically and utilized as a single cell.

In the drawings, Figures 1, 2 and 3 are horizontal sections through these cells, each figure showing a well in the active material each side of the separator, one well of each cell being temporarily filled by the rod which formed it.

A represents the jar or case of the cell, and B a porous separator, preferably of kiln-dried wood. C C are the metallic conducting plates, placed equidistant from the separator, and, as here shown, are in contact with the side walls of the cell. Between these plates and the separator B, is a filling of material D to become active, such filling being applied in the form of a dry powder and packed in firmly. In each of the spaces occupied by this material D, I form in the powder one or more vertical wells E, and I prefer to form them by inserting, vertically, rods F of proper size as many in number as are the wells desired, and by packing the material D firmly around them, and then removing such rods upwardly, leaving suitable openings. The drawings show in each cell one open well and one from which the rod has not been removed. In Figs. 2 and 3, G represents a lining for each well, Fig. 2 illustrating a light, temporary wrapping of thin paper or perforated lead foil, which speedily disintegrates when in ordinary use. The heavier lining in Fig. 3 is formed as a perforated tube of hard rubber or the like, which remains in place, the acid finding access to the active material through the perforations.

I claim as my invention—

1. A battery cell having at each side thereof a metallic conducting plate in contact with its wall, and midway between said plates a vertical wooden separator, in combination with a body of material adapted to become active packed between said separator and plates, and with open vertical wells formed in such material, substantially as set forth.

2. A battery cell comprising a suitable case subdivided by a porous separator, a body of material adapted to become active, and a metallic conductor inclosed in each of the compartments of said case, open vertical wells formed in said material, and linings for the walls of such wells, substantially as set forth.

3. A battery-cell having a body of material adapted to become active, packed between the conducting metallic plate and a porous separator, and a well or open shaft, one side of which consists of the separator, one side of the metallic plate, and two sides of the closely compacted active material, substantially as set forth.

In testimony whereof I have signed my name to this specification, in the presence of two subscribing witnesses, on this 21st day of January, A. D. 1893.

EDWARD P. USHER.

Witnesses:
A. H. SPENCER,
THOMAS J. KENNY.